United States Patent [19]

Sasaki et al.

[11] Patent Number: 5,086,021
[45] Date of Patent: Feb. 4, 1992

[54] DIELECTRIC COMPOSITION

[75] Inventors: Kyoichi Sasaki, Tokyo, Japan; Donald K. Swanson, Wilmington, Del.

[73] Assignee: E.I. Du Pont de Nemours and Company, Wilmington, Del.

[21] Appl. No.: 545,249

[22] Filed: Jun. 28, 1990

[51] Int. Cl.[5] .............................................. C04B 35/46
[52] U.S. Cl. ..................... 501/137; 501/136; 501/138; 252/62.3 BT; 252/520; 252/521
[58] Field of Search ............ 501/136, 137, 138; 252/62.64, 62.62, 62.3 V, 62.3 BT, 520, 521

[56] References Cited

U.S. PATENT DOCUMENTS 4,547,314 10/1985 Masuyama et al. ................ 501/136
4,861,736 8/1989 Ono et al. ............................ 501/137

FOREIGN PATENT DOCUMENTS 0085941 8/1983 European Pat. Off. ............ 501/137
0070398 6/1977 Japan .................................. 501/137
6088876 7/1981 Japan .................................. 501/137
0063605 4/1984 Japan .................................. 501/138
0152265 8/1984 Japan .................................. 501/137
0088401 5/1985 Japan .................................. 501/136
1099210 5/1986 Japan .................................. 501/137

OTHER PUBLICATIONS

Chemical Abstract, "Multilayer Barium Titanate Based Ceramic Capacitor", Takeda et al., JP 63128706 (6/1/88), Matsushita Electric Co.
Chemical Abstract, "Charge for Producing Ferroelectric Ceramic Material", Alekseeva et al., SU 1258825 (9/23/86).
"Dielectric Properties of Barium Titanate Containing Niobium and the Effect of Additives", Borsack et al., pp. 488–492, American Ceramic Soc. Bull., vol. 50, No. 5 (May 1970).

Primary Examiner—William R. Dixon, Jr.
Assistant Examiner—Paul Marcantoni

[57] ABSTRACT

A dielectric ceramic powder composition for forming multilayer ceramic devices having thin dielectric layers with low porosity and having a dissipation factor which meets or exceeds X7R specifications, and consisting essentially of an admixture of a major component ceramic powder particle and minor component additives the amounts of which are controlled within certain predetermined ratios.

6 Claims, 2 Drawing Sheets

DIELECTRIC COMPOSITION

BACKGROUND OF THE INVENTION

The present invention relates to a dielectric ceramic powder composition for forming multilayer ceramic devices having thin dielectric layers with low porosity, and, more particularly, to a densified dielectric composition having a low dissipation factor which meets or exceeds X7R specifications and consists essentially of an admixture of a major component ceramic powder particle and minor component additives the amounts of which are controlled within certain predetermined ratios.

Multilayer ceramic (MLC) capacitors are the most widely used form of ceramic capacitors because of their high volumetric efficiency and their small size. A need exists for a dielectric composition useful in fabricating MLC capacitors with thin layers, e.g., 15 microns or less meeting the EIA, i.e., Electronic Industries Association's specification for X7R-type service. Among the properties which X7R-type dielectric materials must possess are a low dissipation factor (df) of 2.5% or less, an insulation resistance (IR) of at least 1000 ohm-Farads at 25° C. and at least 100 ohm-Farads at 125° C. with no more than ±15% deviation in the dielectric constant, i.e., a temperature coefficient of capacitance (TCC) that is less than ±15% deviation over the temperature range of −55° C. to +125° C. In addition, the dielectric composition should possess a high dielectric constant (K) of 3500 or above, and must sinter to essentially full density giving a mechanically strong body with good insulation resistance, thermal shock resistance and humidity resistance, e.g., low porosity.

Dielectric materials for X7R-type service find extensive use in electronic equipment for data processing, military applications, automotive applications, telecommunications and other applications in which the material is subjected to substantial changes in temperature, frequency and voltages.

The incorporation of certain additives into formulations based on barium titanate to control certain properties important in the performance of a capacitor is known in the art. Japanese 61-99210, for example, describes a dielectric ceramic based on barium titanate containing oxide(s) of praseodymium, neodymium, samarium, dysprosium, niobium and/or magnesium and the molar ratio of niobium oxide to magnesium oxide is 1:04-1:2.2.

It has been discovered in the present invention, that reduction in the df can be achieved by controlling a predetermined ratio of minor component additives, i.e., dopants or metal oxides in atom %. The composition of the present invention is used to fabricate MLC capacitors with low porosity having thin dielectric layers, e.g., 15 microns or less with a df of 2.5% or less, while retaining other properties of the X7R specifications.

SUMMARY OF THE INVENTION

The invention relates to a dielectric ceramic powder composition for forming multilayer ceramic devices having thin dielectric layers with low porosity, and to a densified dielectric composition having a dissipation factor of 2.5% or less, an insulation resistance of 1000 ohm-Farads or more at 25° C. and 100 ohm-Farads or more at 125° C. and a temperature coefficient of capacitance of ±15% deviation or less within a temperature range of −55° C. to +125° C. and consisting essentially of an admixture of:

(a) 97 to 99 wt % of a major component ceramic powder particle; and (b) 1 to 3 wt % of minor component additives selected from the group consisting essentially of the oxides of cerium, neodymium, samarium, lanthanum, niobium, tantalum, manganese, cobalt, nickel, magnesium or mixtures thereof, provided that, a primary cation ratio, CR, is equal to A/B and ranges from more than 0 to about 0.30 wherein A is a sum of atom % for a cation selected from Ce, Nd, Sm, La or mixtures thereof; and B is a sum of atom % for a cation selected from Nb, Ta, Mn, Co, Ni, Mg or mixtures thereof.

A further aspect of the invention is, a secondary cation ratio, BR, which is defined as $B1/(B2+0.5 Mn)$ and ranges from 1.8 to 2.2 wherein B1 is a sum of atom % for an electron donor selected from Nb, Ta or mixtures thereof; and B2 is a sum of atom % for an electron acceptor selected from Co, Ni, Mg or mixtures thereof.

The Mn ion can function as a variable electron acceptor depending on its valence state that it assumes in the perovskite structure and is generally maintained between 2 and 10 atom %, typically about 5 atom % of the total minor component additives.

The major component ceramic powder particle useful in practicing the invention is of a perovskite structure, and can be of a formula, $ABO_3$, wherein A is predominantly an alkaline earth metal or mixtures thereof; and B is predominantly titanium, zirconium, or mixtures thereof. Best results are obtained with a high purity barium titanate as the major component because if impurities exceed about 0.1 wt %, the composition becomes difficult to sinter and the dielectric constant is lowered. High purity refers herein to a barium titanate containing no more than 0.1% by weight of impurities, other than strontium.

The amount of minor component additives are present in the composition within predetermined ratios, which contribute to a decrease in the df by up to 20% and may be used in X7R-type MLC capacitors with low porosity and thin dielectric layers, e.g., 15 microns or less, preferably 10 microns or less. Optionally, a small amount of silica, i.e., up to 0.10 wt % may be present as a densification aid for lowering the firing temperature, thus on sintering the compositions of the present invention yield a mechanically strong body of essentially theoretical density. The sintered body is resistant to thermal shock and humidity and has electrical properties that meet or exceed the X7R specifications.

Another aspect of the present invention is an improved multilayer ceramic device fabricated with the compositions of the present invention.

DETAILED DESCRIPTION OF THE INVENTION

The invention relates to a dielectric ceramic powder composition for forming multilayer ceramic devices having thin dielectric layers with low porosity, and to a densified dielectric composition having a low dissipation factor which meets or exceeds X7R specifications and consists essentially of an admixture of a major component ceramic powder particle and minor component additives the amounts of which are controlled within certain predetermined ratios.

The major component ceramic dielectric powder particle to which this invention applies is of a perovskite structure, and can be of a formula, $ABO_3$, wherein A is predominately an alkaline earth metal or mixtures thereof and B is predominantly titanium, zirconium or mixtures thereof; and the major component ratio A/B is preferred to be close to or less than 1.00. Suitable major component ceramic powders, by way of example and not limitation, are titanates of Mg, Sr, Ba and mixtures thereof. For example, A is barium containing 0 to 0.5% Sr and B is titanium with a mole ratio of (Ba+Sr)/Ti between 0.995 and 1.005 as described in greater detail in U.S. Pat. No. 4,640,905 and U.S. patent application Ser. No. 07/366,286, the teachings of which are incorporated herein by reference. The average particle size is from 0.10 to 10 microns, typically, 0.5 to 2.0 microns and the surface area is in the range from 1 to 10 $m^2/g$. The dielectric constant is in excess of 3500, typically in excess of 4000. Best results are obtained with an average particle size of no more than 1.0 microns of a high purity barium titanate as the major component because if impurities exceed about 0.1 wt %, the composition becomes difficult to sinter and the dielectric constant is lowered. High purity refers herein to a barium titanate containing no more than 0.1% by weight of impurities, other than strontium.

The minor component additives, i.e., dopants or metal oxides useful in practicing the invention are selected from the group consisting essentially of the oxides of cerium, samarium, neodymium, lanthanum, niobium, tantalum, manganese, cobalt, nickel, magnesium or mixtures thereof. The amount of minor component additives is between 1 to 3 wt %. A critical feature of the invention is that the relative amounts of minor component additives are controlled within certain predetermined ratios to obtain a desirable combination of electrical properties, in particular the df, for MLC capacitors having thin dielectric layers and low porosity.

Figure 1:
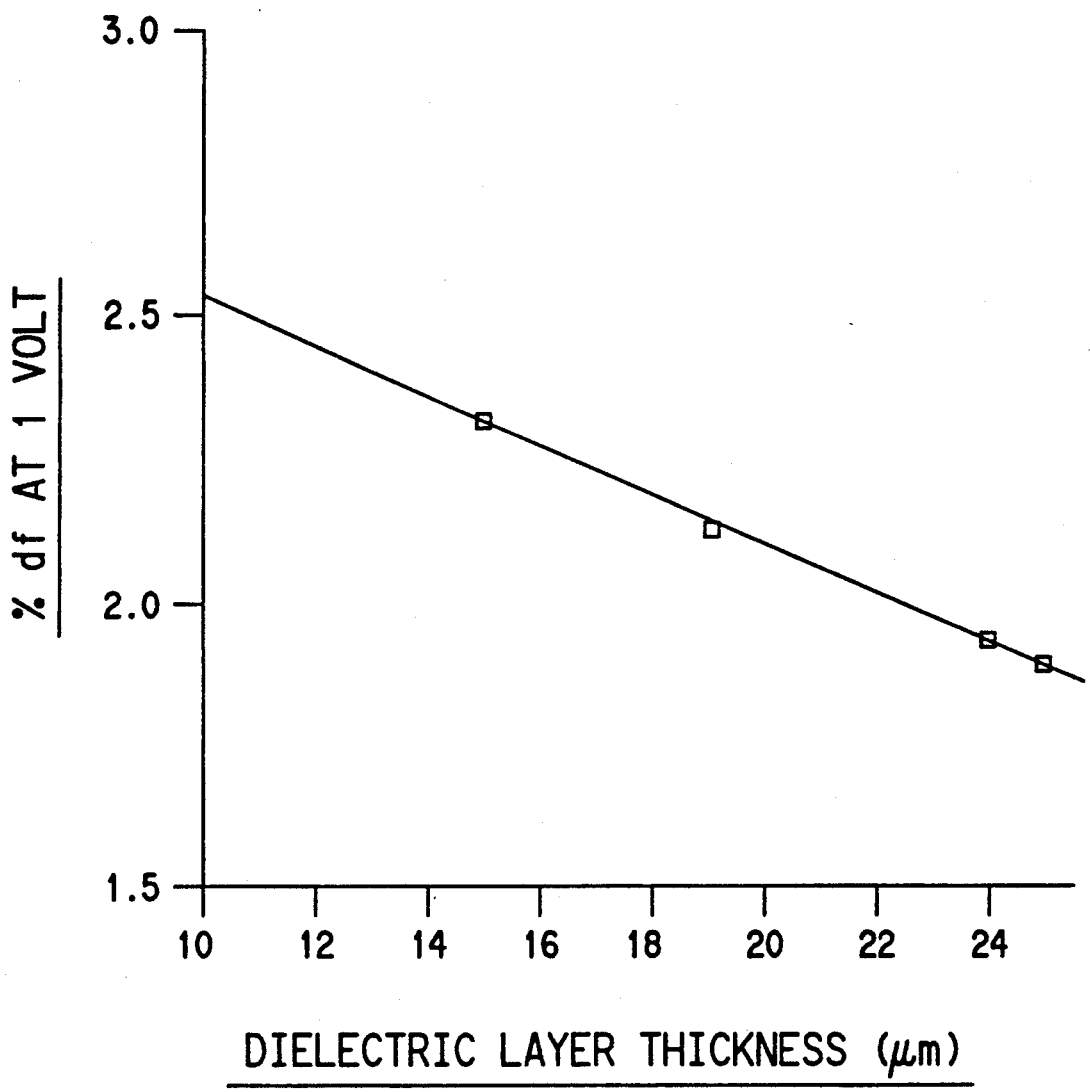
FIG. 1 is a graphic representation of the df as a function of dielectric layer thickness.

Referring now to the drawings, FIG. 1 is a graphic representation of the df at 1 volt as a function of dielectric layer thickness. The df increases as the active layers in a capacitor become thinner if all other parameters remain constant.

Figure 2:
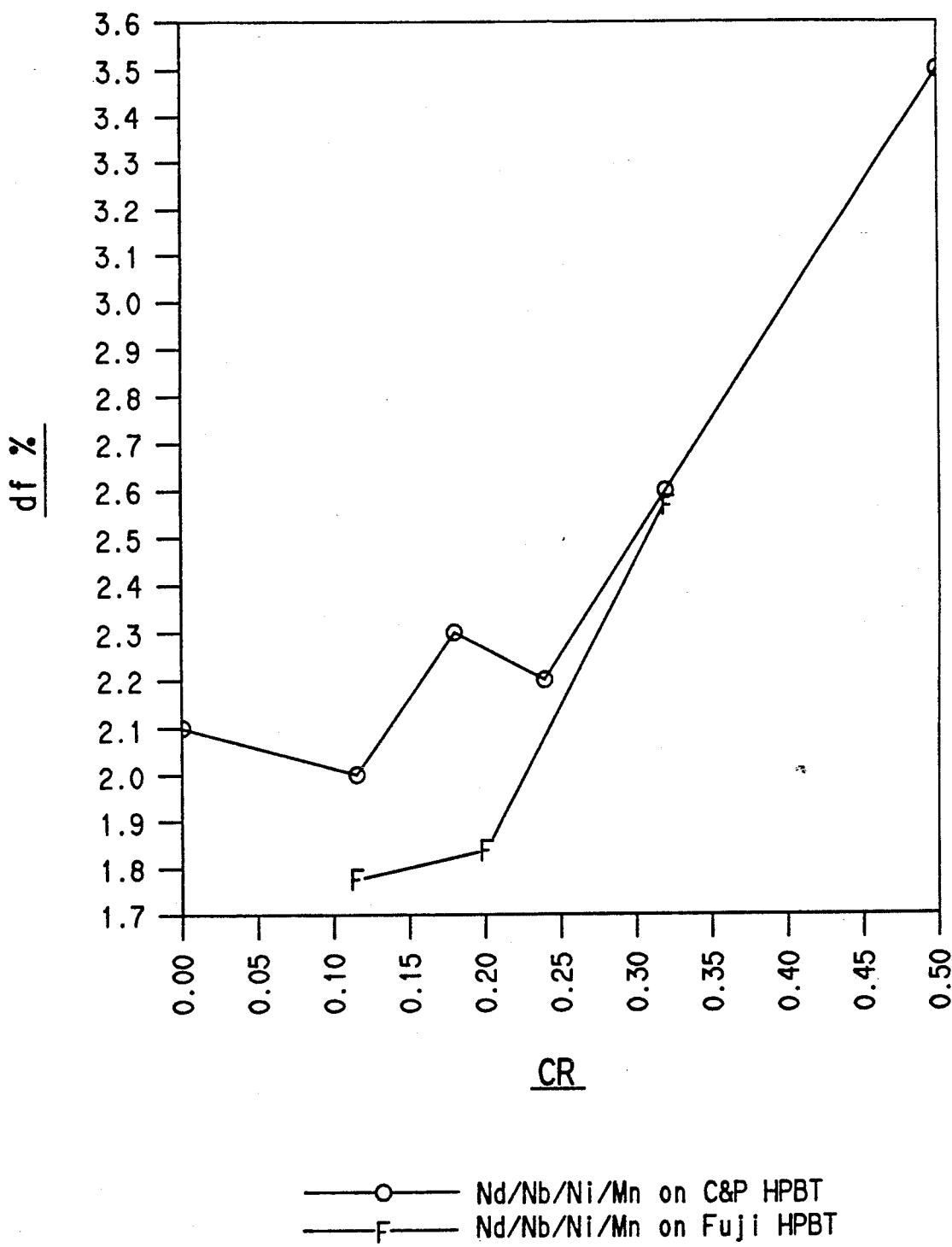
FIG. 2 is a graphic representation of the df dependence on the predetermined cation ratio.

The predetermined ratios are described in terms of a primary cation ratio and a secondary cation ratio. Atom % is defined herein to refer to the wt % of the cation in the minor component additives divided by its atomic weight and then normalized to the sum of the total minor component additives. A primary cation ratio, i.e., CR defines the the relative amounts of additives in the composition and equals A/B and ranges from more than 0 to about 0.30 wherein A is a sum of atom % for a cation selected from Ce, Nd, Sm, La or mixtures thereof; and B is a sum of atom % for a cation selected from Nb, Ta, Mn, Co, Ni, Mg or mixtures thereof. The preferred primary cation ratio is between 0.1 and 0.2. A decrease in the df of up to 20% has been discovered by controlling the primary cation ratio. It will be appreciated by those skilled in the art that when the CR is too low, e.g., 0, the TCC becomes large, i.e., approaches the specification limits for X7R. Therefore, the CR should be maintained above 0, preferably 0.03 to 0.05. Referring again to the drawings, FIG. 2 is a graphic representation of the df dependence on the predetermined cation ratio, i.e., CR. The dfs have been normalized, by estimation, to that of a 12 micron part.

A further aspect of the invention is a secondary cation ratio, BR, which equals B1/(B2+0.5 Mn) and ranges from 1.8 to 2.2 wherein B1 is a sum of atom % for an electron donor selected from Nb, Ta or mixtures thereof, and B2 is a sum of atom % for an electron acceptor selected from Co, Ni, Mg or mixtures thereof. The BR affects primarily the degree of porosity in the sintered MLC capacitor. A large degree of porosity can be distinguished by a lighter color, by adsorption of ink in an ink stain test or by failing a visual inspection based on high magnification scanning electron micrograph (SEM) of a fractured surface of the capacitor. The preferred secondary cation ratio is between 1.9 to 2.1 and will typically pass both the ink stain test and visual inspection based on the SEM. A minimal amount of porosity is observed in a SEM when the BR is 2.0. It will be appreciated by those skilled in the art that porosity is also affected by the firing temperature of the capacitor. The above description refers to a standard rang in firing temperatures of 1240° C. to 1320° C. The Mn ion can function as a variable electron acceptor depending on its valence state that it assumes in the perovskite structure and is generally maintained between 2 and 10 atom %, typically about 5 atom % of the total minor component additives. Optionally, silica may be present up to 0.10 wt % of the total composition to improve the sintering characteristics of the powder.

The compositions of the present invention can be prepared by any of the methods generally known in the art. For example, a method useful in practicing the invention is the traditional blending method described in greater detail, for example, in Adair, et al., "A Review of the Processing of Electronic Ceramics with an Emphasis on Multilayer Capacitor Fabrication", *Journal of Materials Education.* pp. 75-118 (1987). An intimate mixture is made of the ceramic dielectric powder and the additives in desired proportions. Optionally, colloidal silica may be added to give about 0.10 wt % silica in the final composition. The premixed powder is then ball milled for several hours, and typically water or a volatile organic solvent is added forming a milled paste. The milled paste is separated from the milling medium by coarse screening and the paste is then dried to form a cake. The dried cake is pulverized and passed through a fine screen to recover the ceramic powder. Typically, however, the recovered ceramic powder is inherently non-uniform because each component of the mixture has a different particle size distribution, particle morphology and surface property. As a result, the ceramic powder on firing is chemically non-homogeneous, contains pores and voids but is tolerable for MLC capacitors having thick layers, e.g., 20 microns. This method results in the amount of minor component additives between 1 to 3 wt % of the total composition.

Preferably, a second method for preparing the compositions is described in greater detail in U.S. patent application Ser. No. 07/506965, the teachings of which are incorporated herein by reference. Soluble precursors of the minor component additives are added to a slurry of the ceramic dielectric powder and decomposed to deposit a chemically homogeneous coating comprising minor component additives on the surface of the major ceramic powder particles. The compositions are recovered, washed and dried. A calcining step prior to sintering the powder is optional. Colloidal silica may be added to serve as a flux or sintering aid by lowering the firing temperature of the final composition. As a result of this method, the minor component additives amount to 1 to 2 wt % of the total composition. In general, the powders prepared by this method are more uniform on a microscopic scale and a smaller amount of additives is required to achieve the desired performance of the MLC capacitors.

Another aspect of the present invention is an improved multilayer ceramic device fabricated with the compositions of the present invention.

A downstream process for fabricating MLC capacitors is described in greater detail in U.S. Pat. No. 4,640,905, the teachings of which are incorporated herein by reference and involves the steps of forming green unfired sheets of ceramic dielectric material, i.e., green tape which is comprised of finely divided dielectric compositions of the present invention bound together by an organic polymeric material. For example, green tape may be prepared by slip casting a slurry of the dielectric compositions dispersed in a solution of polymer, plasticizer and solvent onto a carrier surface such as polypropylene, "Mylar" polyester film or stainless steel. The thickness of the cast film is controlled by passing the cast slurry under a doctor blade.

Another technique for the downstream processing steps of fabricating MLC capacitors is the "wet process" which may involve passing a flat substrate through a falling sheet of dielectric slip one or more times to build up a dielectric layer, as described in greater detail in U.S. Pat. No. 3,717,487, the teachings of which are incorporated herein by reference; or by brushing a number of thin layers of dielectric slip onto a substrate to build up a dielectric layer of a desired thickness as described in greater detail in U.S. Pat. No. 4,283,753, the teachings of which are incorporated herein by reference.

A final technique available for the downstream processing steps of fabricating MLC capacitors is described in greater detail in U.S. Pat. No. 4,640,905, the teachings of which are incorporated herein by reference and involves forming a paste of the dielectric material and then alternately screen printing the dielectric and metal layers with intervening drying steps until the designed structure is complete. A second electrode layer is then printed atop the dielectric layers and the entire assemblage is cofired.

The composition of the present invention, the process for preparing the same, and the downstream processing steps are illustrated in the following example and tables, but are not intended to limit the scope of the invention.

EXAMPLE 1

This example describes the preparation of barium titanate coated with 0.95 wt % $Nb_2O_5$; 0.45 wt % $Nd_2O_3$; 0.23 wt % NiO and 0.06 wt % MnO corresponding to a total minor component metal oxide content of 1.69 wt %, a primary cation ratio, CR, of 0.24 and a secondary cation ratio, BR, of 2.04. A multilayer capacitor was made from this powder and evaluated.

Deionized water (180 ml) and 34.9 g (0.2573 mole) of D,L-malic acid were charged to a 600 ml beaker under a nitrogen atmosphere. Niobium pentachloride powder (11.6 g, 0.04289 mole) was added to the clear agitated solution at approximately 18°-30° C. and the white slurry was agitated at ambient temperature for approximately 15 minutes. By means of a syringe pump aqueous sodium hydroxide solution (96.5 g, 30%, 0.7238 mole) was added over a period of 70 minutes to the slurry at approximately 25° C. To the resulting clear colorless solution, pH 8.55, was added neodymium chloride hexahydrate (5.76 g, 0.01605 mole) and the clear light blue violet solution was agitated for approximately 10 minutes. Nickelous chloride hexahydrate (4.39 g, 0.01847 mole) was added and the clear light greenish blue solution was agitated for approximately 5 minutes. Manganous chloride tetrahydrate (1.00 g, 0.005075 mole) was added to the solution and the mixture was agitated for approximately 15 minutes. To the mixture, which contained a small amount of a light grayish green precipitate was added (1.00 g, 0.007383 mole) of D,L-malic acid and the mixture was agitated at approximately 25° C. for about 10 minutes. The clear greenish blue metal chelate solution, pH 6.1, was diluted to 600 g by the addition of deionized water, (pH=6.21; conductivity=66475 mhos. The solution was filtered through a Millipore filter, (0.2 microns).

Into a separate one gallon container was added 2000 ml of deionized water and 491.1 g of barium titanate and 1.25 g of colloidal silica in the form of Ludox, AS 40 available from E. I. du Pont de Nemours and Company, Wilmington, Del. The barium titanate for this experiment was made by the alkoxide process described in U.S. patent application Ser. No. 07/265,295, the teachings of which are incorporated herein by reference. The barium titanate was calcined at 1060° C. for four hours and the major component A/B ratio determined by X-ray fluorescence analysis was 1.004. The average particle size was 0.68 microns and the surface area was 2.3 $m^2/g$. The mixture was agitated for 15 minutes. To the slurry, the metal chelate solution (500 g) was added at approximately 25° C. and the mixture allowed to agitate for 1.5 hours. The slurry was allowed to remain at approximately 25° C. overnight (pH=7.5). By means of a syringe pump aqueous sodium hydroxide solution (12.9 g, 50%, 0.1613 mole) was added over approximately 110 minutes at 25° C. The cream colored slurry, pH 12.0, was agitated at approximately 25° C. for about 30 minutes. The slurry was heated under reflux, 103° C., for 4.5 hours. After cooling to approximately 25° C. the cream colored slurry, pH 11.9 was filtered. The filter cake was washed with 14 liters of deionized water and dried to give 492.7 g (98.5% yield) of a light tan solid having a surface area of 6.7 $m^2/g$.

The product was examined using transmission electron microscopy (TEM) and energy dispersive spectroscopy (EDS). No precipitated oxides were observed separate from barium titanate particles and they were all present in the coating. The various coating elements were homogeneously distributed throughout the coating, because all areas of the coating examined by EDS contained all the coating elements in the relative amounts that approximated the ratios used in the preparation. The coating was seen to be amorphous and/or very fine microcrystalline and it was distributed non-uniformly on the barium titanate particle surface. Areas with and without coating were easily recognized in the TEM images. Most but not all of the barium titanate particles have some coating.

The product was shown by X-ray fluorescence analysis to have a (Ba+Sr)/Ti mole ratio of 1.001.

By ICP analysis the components other than (Ba+Sr)$TiO_3$ were found to be 1.019% $Nb_2O_5$; 0.423% $Nd_2O_3$; 0.284% NiO; 0.065% MnO; 0.098% $SiO_2$ and 0.015% $Na_2O$.

Fifty grams of this powder were mixed with 1.1 g of AB 1015 Surfactant available from E. I. du Pont de Nemours and Company, Wilmington, Del. and 18.9 g of 1-1-1 Trichlorethane and ball milled with zirconia media for 3 hours. 11.9 g of 5200 binder and 1.1 g of Santicizer 160 available from Monsanto Company, St. Louis, Mo. were then added to this slip and it was ball milled for an additional 3 hours. The resulting slip was then cast as a green tape onto a polypropylene tape using a 4 mil doctor blade. The green tape was then cut and printed with Metz 100% Pd electrode using a 400 mesh screen for MLC 1209 size. The green MLC capacitor block was then laminated at 8 tons for 2 minutes and then cut into individual MLC capacitors. These parts were baked out and then fired on a zirconia sled at a ramp rate of 5° C./min up to 1320° C. with a soak interval of 1.5 hours and a cooling ramp rate of 5° C./min down to 800° C. before shutting down the furnace. The fired parts were then terminated with a silver/palladium termination paste and fired at 800° C. for 5 minutes. The parts were then leaded and tested at 1 Khz and 1 Volt for capacitance, df, and TCC data and at 100 V for IR properties.

Capacitors having 5 active layers, each of which averaged 16 microns in thickness, had the following averaged properties: dielectric constant of 3700, df of 2.1%, an IR at 25° C. of 6,070 ohm-farads, an IR at 125° C. of 470 ohm-farads, and maximum deviations in the TCC of +5% at −55° C. and −8% at +85° C.

Tables 1 and 2 illustrate various examples of the compositions of the present invention prepared by the traditional blending method except for Tape 9 which was prepared by the coating method. The Additives Column, A, B1, B2a, B2b are present as the oxides of cerium, neodymium, lanthanum, niobium, manganese, cobalt, nickel, magnesium and mixtures thereof. Tapes 5, 6, 12 and 14 are comparative examples. For tapes 14–16, the major component ceramic powder particles is barium titanate available from Fuji made by the oxalate process.

TABLE 1

| Tape | Additives A/B1/B2a/B2b | A wt % | B1 wt % | B2a wt % | B2b wt % | SiO$_2$ wt % | SUMOX wt % | CR | BR | T (°C.) fire | K | % df | t (microns) |
|---|---|---|---|---|---|---|---|---|---|---|---|---|---|
| 1 | Nd/Nb/Ni/Mn | 0.000 | 1.236 | 0.314 | 0.050 | 0.100 | 1.600 | 0.000 | 2.04 | 1320 | 4050 | 1.97 | 15 |
| 2 | Nd/Nb/Ni/Mn | 0.244 | 1.046 | 0.263 | 0.048 | 0.100 | 1.600 | 0.120 | 2.04 | 1320 | 3740 | 1.80 | 17 |
| 3 | Nd/Nb/Ni/Mn | 0.340 | 0.970 | 0.243 | 0.047 | 0.100 | 1.600 | 0.180 | 2.04 | 1320 | 4100 | 2.14 | 15 |
| 4 | Nd/Nb/Ni/Mn | 0.423 | 0.906 | 0.225 | 0.046 | 0.100 | 1.600 | 0.240 | 2.04 | 1320 | 3420 | 2.01 | 18 |
| 5 | Nd/Nb/Ni/Mn | 0.520 | 0.830 | 0.205 | 0.045 | 0.100 | 1.600 | 0.320 | 2.04 | 1320 | 4220 | 2.52 | 13 |
| 6 | Nd/Nb/Ni/Mn | 0.686 | 0.700 | 0.170 | 0.043 | 0.100 | 1.600 | 0.500 | 2.04 | 1320 | 4980 | 3.33 | 15 |
| 7 | La/Nb/Ni/Mn | 0.507 | 0.840 | 0.207 | 0.046 | 0.100 | 1.600 | 0.320 | 2.04 | 1320 | 4110 | 2.15 | 16 |
| 8 | La/Nb/Ni/Mn | 0.360 | 0.955 | 0.238 | 0.047 | 0.100 | 1.600 | 0.200 | 2.04 | 1320 | 4200 | 2.02 | 16 |
| 9 | Ce/Nb/Ni/Mn | 0.440 | 0.950 | 0.230 | 0.060 | 0.100 | 1.680 | 0.242 | 2.04 | 1320 | 3640 | 1.82 | 14 |
| 10 | Nd/Nb/Co/Mn | 0.519 | 0.831 | 0.206 | 0.045 | 0.100 | 1.600 | 0.320 | 2.04 | 1320 | 4030 | 2.24 | 15 |
| 11 | Nd/Nb/Co/Mn | 0.369 | 0.948 | 0.237 | 0.047 | 0.100 | 1.600 | 0.200 | 2.04 | 1320 | 3690 | 2.05 | 14 |
| 12 | Nd/Nb/Mg/Mn | 0.553 | 0.880 | 0.120 | 0.048 | 0.100 | 1.600 | 0.320 | 2.00 | 1320 | 3930 | 2.70 | 15 |
| 13 | Nd/Nb/Ni/Mn | 0.397 | 1.014 | 0.139 | 0.050 | 0.100 | 1.600 | 0.200 | 2.00 | 1320 | 3980 | 2.26 | 15 |
| 14 | Nd/Nb/Ni/Mn | 0.519 | 0.827 | 0.209 | 0.045 | 0.100 | 1.600 | 0.320 | 2.00 | 1320 | 4690 | 2.46 | 15 |
| 15 | Nd/Nb/Ni/Mn | 0.369 | 0.943 | 0.241 | 0.047 | 0.100 | 1.600 | 0.200 | 2.00 | 1320 | 4470 | 1.72 | 15 |
| 16 | Nd/Nb/Ni/Mn | 0.229 | 0.976 | 0.251 | 0.045 | 0.100 | 1.500 | 0.120 | 2.00 | 1320 | 4320 | 1.66 | 15 |

TABLE 2

| Tape | est % df for 12 microns | IR (25° C.) | IR (125° C.) | TCC % max dev −55 to +25° C. | TCC % max dev +25 to 125° C. | Porosity |
|---|---|---|---|---|---|---|
| 1 | 2.1 | 21540 | 1060 | 5 | −11 | |
| 2 | 2.0 | 15090 | 840 | 2 | 4 | |
| 3 | 2.3 | 18990 | 870 | 3 | −5 | moderate |
| 4 | 2.3 | 6720 | 780 | 5 | −6 | mod large |
| 5 | 2.6 | 20950 | 1070 | 7 | −12 | moderate |
| 6 | 3.5 | 28620 | 1430 | −8 | −29 | |
| 7 | 2.3 | 16840 | 1250 | 6 | −13* | |
| 8 | 2.2 | 12590 | 880 | 2 | −4 | |
| 9 | 1.9 | 3260 | 300 | 8 | −7 | trace |
| 10 | 2.4 | 9700 | 950 | 6 | −10 | |
| 11 | 2.1 | 6650 | 660 | 5 | −5 | |
| 12 | 2.8 | 15950 | 1080 | 4 | −12 | |
| 13 | 2.4 | 15970 | 990 | 4 | −5 | |
| 14 | 2.6 | 11800 | 1220 | 13 | −12 | |
| 15 | 1.8 | 8150 | 730 | 13 | 7 | |
| 16 | 1.8 | 8710 | 830 | 11 | 11 | |

Tables 3 and 4 illustrate compositions of the present invention prepared by the coating process. Tapes 3, 5, 7 and 8 are comparative examples.

TABLE 3

| Tape | A/B1/B2a/B2b | A wt % | B1 wt % | B2a wt % | B2b wt % | SiO$_2$ wt % | SUMOX wt % | CR | BR | T (C.) fire | K | % df | t (microns) |
|---|---|---|---|---|---|---|---|---|---|---|---|---|---|
| 1 | Nd/Nb/Ni/Mn | 0.450 | 0.750 | 0.200 | 0.050 | 0.100 | 1.450 | 0.296 | 1.86 | 1300 | 4270 | 2.12 | 19 |
| 2 | Nd/Nb/Ni/Mn | 0.380 | 0.750 | 0.200 | 0.050 | 0.100 | 1.380 | 0.250 | 1.86 | 1300 | 4550 | 1.80 | 20 |
| 3 | Nd/Nb/Ni/Mn | 0.300 | 0.750 | 0.200 | 0.050 | 0.100 | 1.300 | 0.198 | 1.86 | 1300 | 4240 | 2.14 | 19 |
| 4 | Nd/Nb/Ni/Mn | 0.359 | 1.025 | 0.256 | 0.050 | 0.100 | 1.690 | 0.180 | 2.04 | 1320 | 3790 | 2.02 | 14 |
| 5 | Nd/Nb/Ni/Mn | 0.450 | 0.750 | 0.150 | 0.050 | 0.100 | 1.400 | 0.320 | 2.40 | 1240 | 2950 | 6.10 | 24 |
| 6 | Nd/Nb/Ni/Mn | 0.450 | 0.750 | 0.200 | 0.050 | 0.100 | 1.450 | 0.300 | 1.90 | 1240 | 4180 | 2.00 | 24 |
| 7 | Nd/Nb/Ni/Mn | 0.450 | 0.750 | 0.250 | 0.050 | 0.100 | 1.500 | 0.280 | 1.50 | 1240 | 3940 | 2.20 | 24 |

TABLE 3-continued

| Tape | A/B1/B2a/B2b | A wt % | B1 wt % | B2a wt % | B2b wt % | SiO₂ wt % | SUMOX wt % | CR | BR | T (C.) fire | K | % df | t (microns) |
|---|---|---|---|---|---|---|---|---|---|---|---|---|---|
| 8 | Nd/Nb/Ni/Mn | 0.383 | 0.790 | 0.283 | 0.045 | 0.100 | 1.500 | 0.220 | 1.45 | 1240 | | too porous | |
| 9 | Nd/Nb/Ni/Mn | 0.423 | 0.906 | 0.225 | 0.046 | 0.100 | 1.600 | 0.240 | 2.04 | 1320 | 4020 | 2.08 | 16 |

TABLE 4

| Tape | Est % df for 12 um | IR (25° C.) | IR (125° C.) | TCC % max dev <25° C. | TCC % max dev >25° C. | Porosity |
|---|---|---|---|---|---|---|
| 1 | 2.40 | 11200 | 840 | 9 | −14 | trace |
| 2 | 2.12 | 7440 | 690 | 14 | −12 | minor |
| 3 | 2.42 | 6520 | 780 | −5 | −19 | moderate |
| 4 | 2.10 | 11510 | 650 | 10 | −6 | none |
| 5 | 6.58 | 2520 | 310 | 2 | −11 | high |
| 6 | 2.48 | 10050 | 450 | 10 | −10 | minor |
| 7 | 2.68 | 8460 | 390 | 10 | −14 | high |
| 8 | — | — | — | — | — | extreme |
| 9 | 2.24 | 8960 | 680 | 10 | −8 | trace |

What is claimed:

1. A composition for forming a multilayer ceramic device having a thin dielectric layer with lower porosity and having a dissipation factor of 2.5% of less, an insulation resistance of 1000 ohm-Farads or more at 25° C. and 100 ohm-Farads or more at 125° C. and a temperature coefficient of capacitance of ±15% deviation or less within a temperature range of −55° C. to +125° C. and consisting essentially of an admixture of:
   (a) 97 to 99 wt % of a major component ceramic powder particle; and
   (b) 1 to 3 wt % of minor component additives selected from the group consisting essentially of the oxides of cerium, neodymium, samarium, lanthanum, niobium, tantalum, manganese, cobalt, nickel, magnesium or mixtures thereof, provided that, a primary cation ratio, CR, equals A/B and ranges from more than 0 to about 0.30 wherein
   A is a sum of atom % for a cation selected from Ce, Nd, Sm, La or mixtures thereof; and
   B is a sum of atom % for a cation selected from Nb, Ta, Mn, Co, Ni, Mg or mixtures thereof
   and, further provided, a secondary cation ratio, BR, equals B1/(B2+0.5 Mn) and ranges from 1.8 to 2.2 wherein
   B1 is a sum of atom % of an electron donor selected from Nb, Ta or mixtures thereof; and
   B2 is a sum of atom % for an electron acceptor selected from Co, Ni, Mg or mixtures thereof Mn is atom % of manganese.

2. The composition of claim 1 wherein the major component ceramic powder particle is of the formula, $ABO_3$, wherein A is predominantly an alkaline earth metal or mixtures thereof, and B is predominantly titanium, zirconium or mixtures thereof and the mole ratio of A/B is between 0.995 and 1.005.

3. The composition of claim 2 wherein the major component ceramic powder particle is a high purity barium titanate having an average particle size of 2.0 microns or less.

4. A composition for forming a densified dielectric body in a thin dielectric layer with low porosity and having a dissipation factor of 2.5% or less, an insulation resistance of 1000 ohm-Farads or more at 25° C. and 100 ohm-Farads or more at 125° C. and a temperature coefficient of capacitance of ±15% or less within a temperature range of −55° C. to +125° C. and consisting essentially of:
   (a) 98 to 99 wt % of a high purity barium titanate;
   (b) 1 to 2 wt % of minor component additives selected from the group consisting of the oxides of cerium neodymium, niobium, manganese, nickel and mixtures thereof, provided that, a primary cation ratio, CR, equals A/B and ranges from 0.1 to 0.2 wherein
   A is Ce cation or Nd cation in atom %; and
   B is Nb, Mn or Ni cations in atom % and further provided that a secondary cation ratio, BR, equals
   B1/(B2+0.5 Mn) and ranges from 1.9 to 2.1 wherein B1 is Nb cation in atom % and B2 is Ni cation in atom %.

5. The composition of claim 1 or claim 4 further comprising up to 0.10 wt % of silica in the total composition.

6. The composition of claim 1 or claim 4 wherein the Mn cation is between 2 to 10 atom %.

* * * * *

UNITED STATES PATENT AND TRADEMARK OFFICE
CERTIFICATE OF CORRECTION

PATENT NO. : 5,086,021
DATED : February 4, 1992
INVENTOR(S) : Kyoichi Sasaki, et al It is certified that error appears in the above-identified patent and that said Letters Patent is hereby corrected as shown below:

Column 1, line 50, delete "1:04" and insert --1:0.4--.

Column 4, line 22, delete the word "rang" and insert --range--.

Col. 9, line 23, delete the word "of" (2nd occurrence) and insert --or--; line 30, after the word "particle" delete "; and" and insert --wherein the major component ceramic powder particle is of the formula, $ABO_3$, wherein A is predominately an alkaline earth metal or mixtures thereof, and B is predominately titanium, zirconium or mixtures thereof--;

Column 10, line 47, after "atom %" insert --and Mn is atom % of manganese--.

Signed and Sealed this

Twenty-second Day of June, 1993

Attest:

MICHAEL K. KIRK

*Attesting Officer*   *Acting Commissioner of Patents and Trademarks*